(12) United States Patent
Takeshita et al.

(10) Patent No.: US 6,583,957 B1
(45) Date of Patent: Jun. 24, 2003

(54) MAGNETIC HARD DISK HAVING CONCENTRIC MAGNETIC TRACKS WITH FLAT SURFACE AND FABRICATION METHOD THEREOF

(75) Inventors: Hiroto Takeshita, Isehara (JP); Ryoichi Mukai, Kawasaki (JP); Wataru Yamagishi, Ebina (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/468,962

(22) Filed: Dec. 22, 1999

(30) Foreign Application Priority Data

Dec. 28, 1998 (JP) .............................. 10-374594

(51) Int. Cl.⁷ ................................. G11B 5/82
(52) U.S. Cl. .................. 360/135; 428/694 SG
(58) Field of Search .................. 360/135, 131; 428/694 TR, 694 TP, 694 SG (56) References Cited

U.S. PATENT DOCUMENTS

| 4,935,378 | A | * | 6/1990 | Kroumbi et al. ............... 428/64 |
| 5,768,075 | A | * | 6/1998 | Bar-Gadda .................. 360/135 |
| 6,055,139 | A | * | 4/2000 | Ohtsuka et al. ............. 360/131 |
| 6,180,208 | B1 | * | 1/2001 | Shiratori et al. ......... 204/192.2 |
| 6,268,978 | B1 | * | 7/2001 | Tani et al. .................. 360/135 |

FOREIGN PATENT DOCUMENTS

| JP | 62256225 | | 11/1987 |
| JP | 02201732 | * | 8/1990 |
| JP | 3252922 | | 11/1991 |
| JP | 04034718 | * | 2/1992 |
| JP | 04089616 | * | 3/1993 |
| JP | 817155 | | 1/1996 |
| JP | 1083640 | | 3/1998 |
| JP | 1139633 | | 2/1999 |

* cited by examiner

*Primary Examiner*—David Hudspeth
*Assistant Examiner*—Angel Castro
(74) *Attorney, Agent, or Firm*—Greer, Burns & Crain, Ltd

(57) ABSTRACT

A magnetic hard disk has magnetic tracks for storing data, which is read or written by a magnetic head floating immediately above the magnetic track while the magnetic hard disk is rotating. The magnetic head rests on the magnetic hard disk while the magnetic hard disk is not rotating. The magnetic hard disk comprises a non-magnetic substrate having a plurality of banks and grooves alternately and concentrically arranged thereon, a magnetic film formed on each of the banks, and a non-magnetic material formed on an entire surface of the substrate all over the banks and grooves such that roughness of the upper surface of the non-magnetic material is in a range between 0.5 nm and 3 nm.

15 Claims, 9 Drawing Sheets

Time (hours)

MAGNETIC HARD DISK HAVING CONCENTRIC MAGNETIC TRACKS WITH FLAT SURFACE AND FABRICATION METHOD THEREOF

CROSS-REFERENCE TO RELATED APPLICATIONS

This application is based upon and claims priority of Japanese Patent Application No. Hei 10-374594, the filed contents being incorporated herein by reference.

BACKGROUND OF THE INVENTION

1. Field of the Invention

The present invention relates to a magnetic hard disk capable of writing and reading magnetic data thereon, and more particularly, to a magnetic hard disk having-concentric magnetic tracks spaced to each other on a non-magnetic substrate, and a fabrication method thereof.

2. Description of the Related Art

As the infrastructure of information and communication in the society is progressed, a magnetic hard disk driver (or HDD) as an external memory of computers rises in importance increasingly, and its storage density increases rapidly year by year. Tendency for seeking smaller size and larger volume in the memory demands narrower magnetic tracks and higher storage density for the magnetic hard disk.

Since storage density of the magnetic hard disk depends upon both of linear density along a track and track density in the radial direction, improvement of either one or both results in higher storage density of the magnetic hard disk. The present invention is directed to an improvement of a technology related to the track density.

Figure 1:
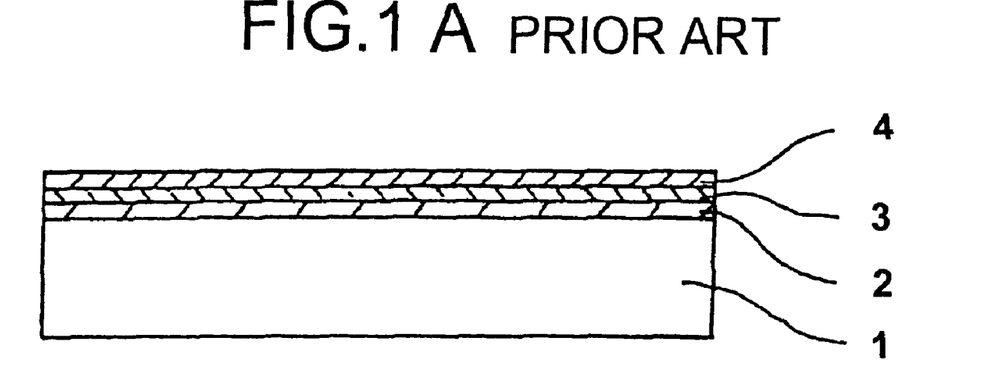
FIG. 1A is a partial cross-sectional view of a prior art magnetic hard disk having a continuous magnetic film.
FIG. 1B is a partial cross-sectional view of a prior art magnetic hard disk having a groove between concentric tracks.

In general, auxiliary data is initially recorded on a magnetic hard disk, which is information necessary for writing or reading data on the magnetic hard disk, such as servo data (or tracking servo data) for positioning a magnetic head on a track, address data for registering a position of writing data and PLL lock data for reading out address data. To increase the track density, simply narrowing a space between tracks results in a serious problem under a circumstance that a track is generated by writing data by a magnetic head as in conventional manner. FIG. 1A is a partial cross-sectional view of a typical conventional magnetic hard disk having a continuous magnetic film, in which the magnetic disk consists of a flat substrate 1 and successively laminated three thin films of chromium 2, cobalt-chromium-platinum-tantalum alloy 3, and amorphous carbon 4. When narrow-pitched magnetic tracks are written on a continuous magnetic film by simply narrowing a spacing between magnetic head trajectories of the nearest neighbors, a stray magnetic field coming out laterally from both sides of the magnetic head magnetizes a guard band between tracks, which resultantly causes magnetic noises. Narrowing track width also gives rise to decrease of a signal to noise ratio (or S/N) problem at reading out a written data. A similar problem occurs in recording of tracking servo data for controlling a position of a magnetic head. As the track width is narrowed, it becomes increasingly difficult to obtain a highly accurate servo data. To maintain the S/N ratio for narrower track width, it has been proposed to form various physical features such as bumps or grooves on a surface of a disk substrate by which servo signal or position of a track is determined (for instance, a Japanese Laid Open Patent Application H3-252922). According to this technique, a servo mark is formed on the magnetic disk for tracking a magnetic head by which the magnetic head can be controlled to follow a magnetic track with high accuracy. The servo mark is written by a servo writer. Narrow track width for higher track density requires higher accuracy in positioning the servo mark, which further needs higher positioning accuracy between a servo writer and a HDD. Therefore, a drawback of this approach is a requirement for higher technical accuracy to the positioning device, which incurs extra cost. To overcome this drawback, it has been proposed to preform the servo mark by which accuracy in positioning the servo mark can be increased. Several methods for pre-forming the servo mark are disclosed, for instance, by etching a magnetic film as in Japanese Laid Open Patent Applications S62-256225 and H1-23418, or by forming bumps and grooves on a disk substrate as in H8-17155. FIG. 1B is a partial cross-sectional view of another typical conventional magnetic hard disk having a partially refilled groove between magnetic tracks neighboring each other, in which the magnetic disk consists of a flat substrate 1 and successively laminated three thin films of chromium 2, cobalt-chromium-platinum-tantalum alloy 3, and amorphous carbon 4, as same as FIG. 1A, except that there are partially refilled grooves 7 between pre-determined tracks 8.

However, a drawback of these methods is to leave surface roughness from several tens of nanometers to several hundreds of nanometers in overall height on the magnetic disk. Since floating stability of a magnetic head, which means how stably a magnetic head can maintain a predetermined distance from the rotating magnetic disk, for a magnetic disk of high track density in a conventional HDD can be attained by flattening and smoothing the surface of a magnetic disk, and since decrease of the distance between a floating magnetic head and a magnetic disk is also needed to operate a magnetic disk having higher density maintaining the appropriate S/N ratio, both approaches clearly conflicts with these technical requirements.

SUMMARY OF THE INVENTION

An object of the present invention is to provide a magnetic hard disk having a plurality of concentrically disposed magnetic tracks with high radial density, which maintains sufficiently long durability of a non-contact magnetic head floating immediately above the magnetic tracks, the magnetic hard disk comprising a non-magnetic substrate having an upper surface with a concentrically patterned magnetic film thereon,: and a non-magnetic protecting film on the entire upper surface of the magnetic hard disk, wherein roughness of the upper surface of the non-magnetic protecting film is in a range between 0.5 nm and 3 nm.

Another object of the present invention is to provide a magnetic hard disk having high radial density of magnetic tracks without degrading signal to noise ratio. According to one aspect of the invention, a magnetic hard disk comprises a non-magnetic substrate having alternately disposed concentric banks and grooves on the upper surface, a magnetic film on each of the concentric banks, and a non-magnetic film covering the magnetic film and refilling the grooves such that the upper surface of the non-magnetic film has the same surface roughness and continuity across the banks and grooves.

Further object of the present invention is to provide a reliable method for fabricating the magnetic hard disk having high radial density of magnetic tracks, the method comprise the steps of forming alternately disposed concentric banks and grooves on a non-magnetic substrate, forming a magnetic film and a first non-magnetic film on each of thee concentric banks, successively forming a second non-magnetic film on an entire surface of the magnetic hard disk so as to cover the first no-magnetic film and refill the grooves therewith, removing the second non-magnetic film from the upper surface of the first non-magnetic film by Damascene method until the first non-magnetic film is exposed, and subsequently forming a third non-magnetic film on an entire surface of the magnetic hard disk and finally roughening the upper surface of the third non-magnetic film such that roughness of the upper surface of the third non-magnetic film falls in a range between 0.5 nm and 3 nm.

BRIEF DESCRIPTION OF THE DRAWINGS

The present invention will be more apparent from the following description, when taken to conjunction with the accompanying drawings, in which.

DESCRIPTION OF THE PREFERRED EMBODIMENT

Figure 2:
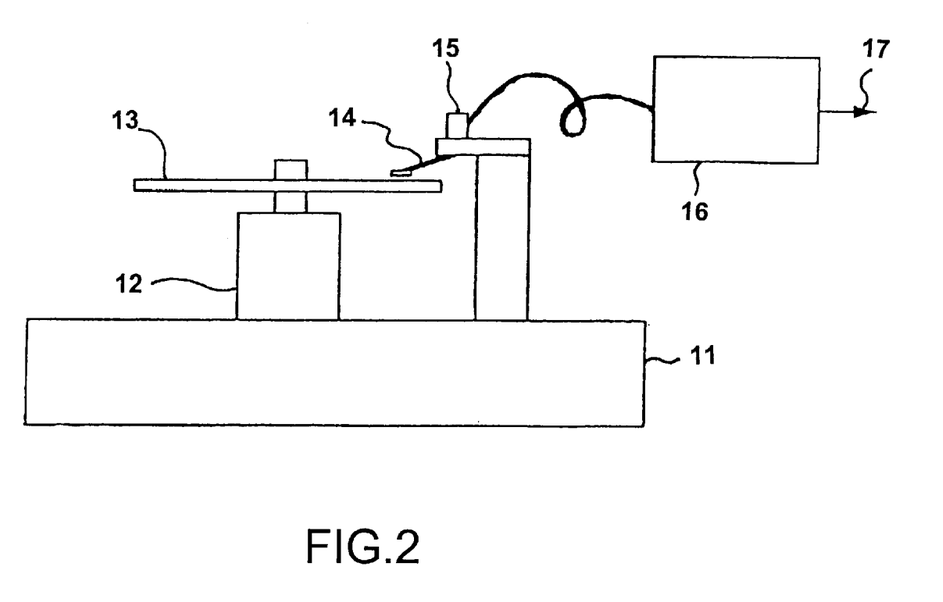
FIG. 2 is an instrument for the acoustic emission measurement.
Figure 3:
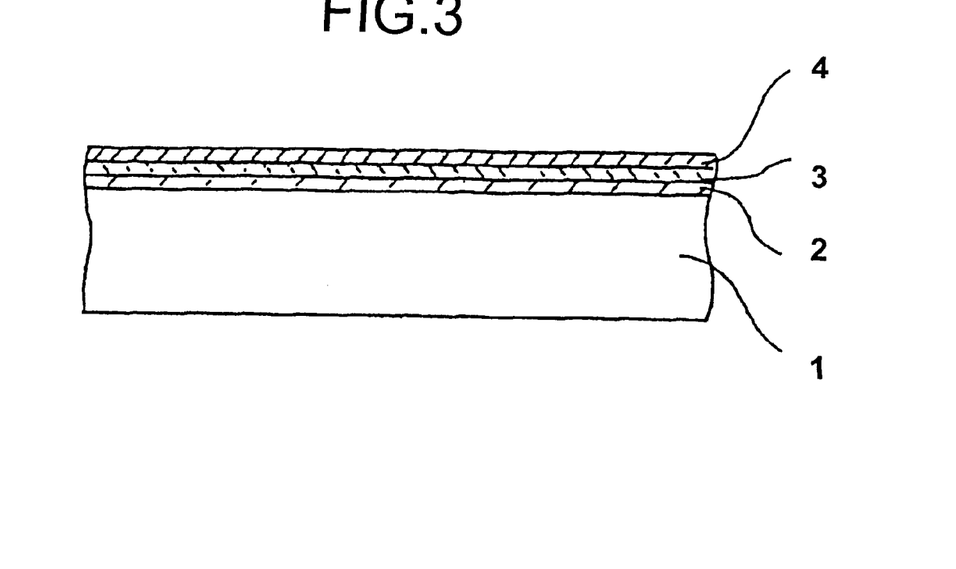
FIG. 3 is a partial cross-sectional view of a magnetic hard disk having a continuous magnetic film for magnetic head stability test.
Figure 4:
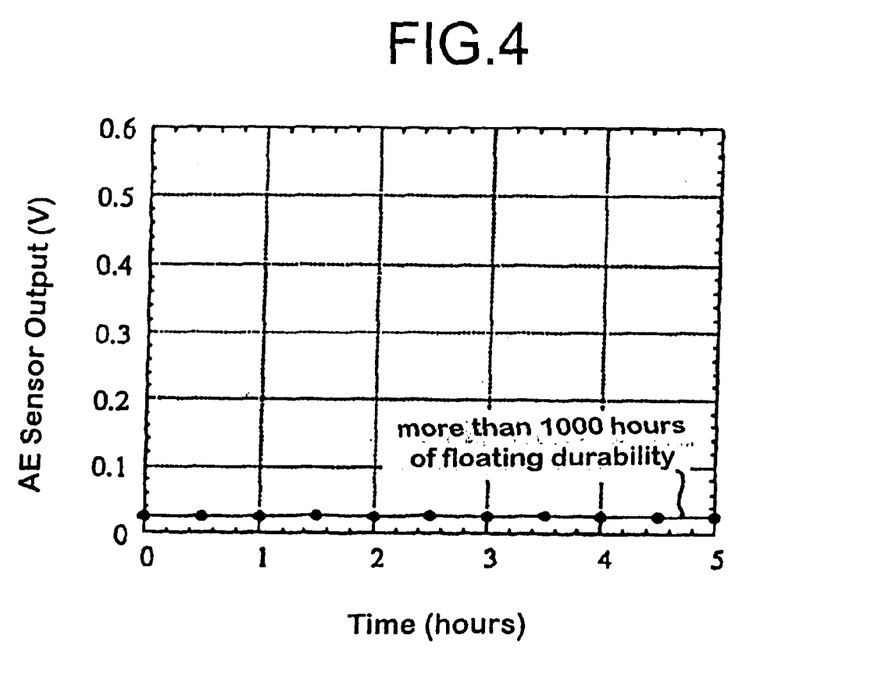
FIG. 4 is a graph of relationship between an output voltage of the acoustic emission (or AE) sensor and duration time on the magnetic hard disk shown in FIG. 3.
Figure 5:
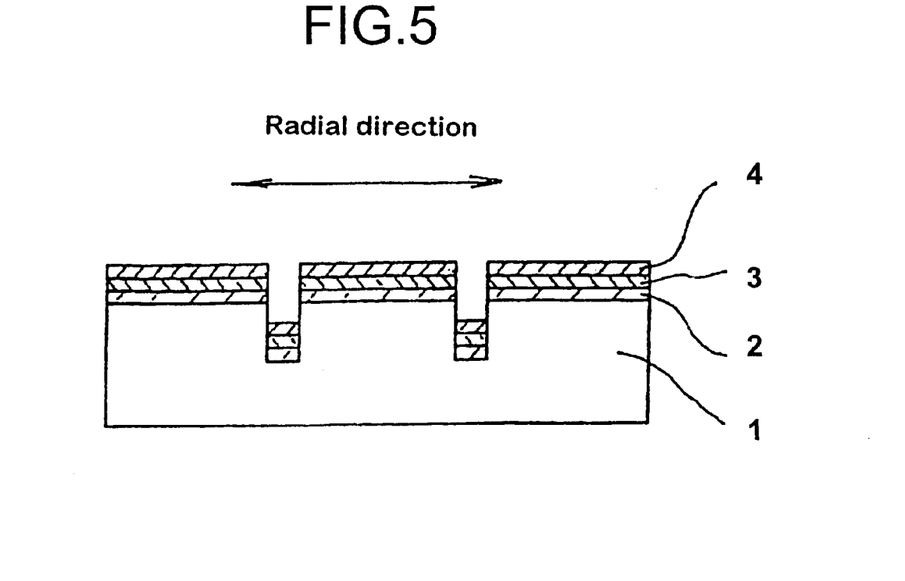
FIG. 5 is a partial cross-sectional view of a magnetic hard disk having a groove between concentric tracks for magnetic head stability test.
Figure 6:
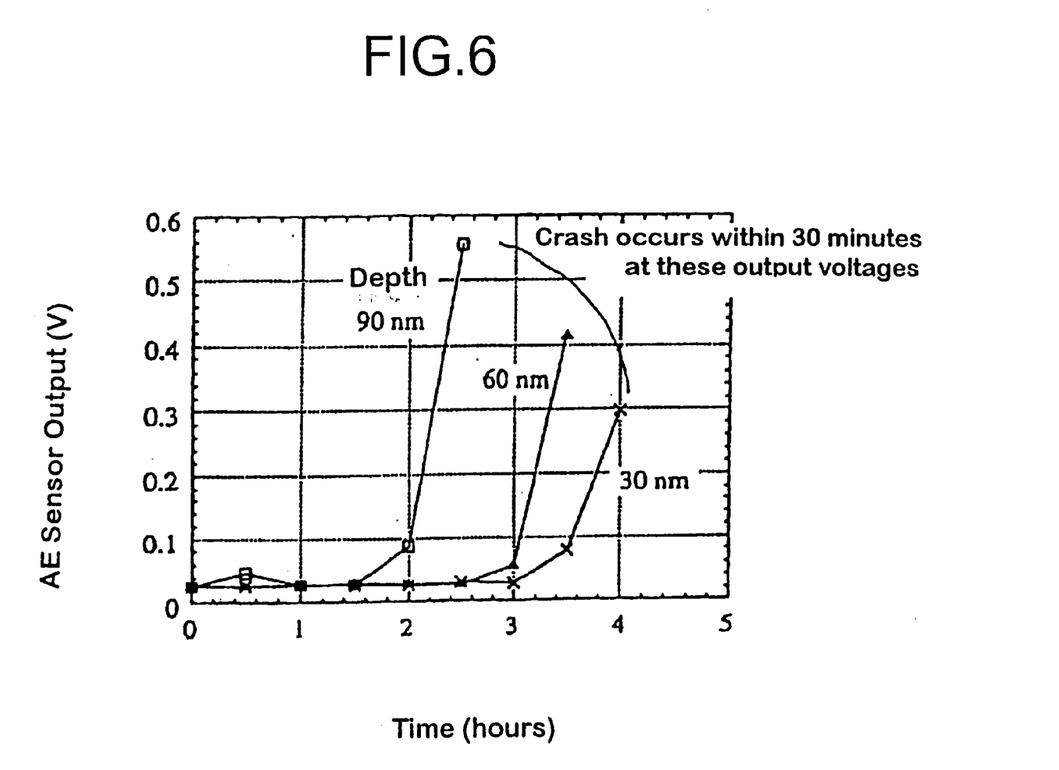
FIG. 6 is a graph of relationship between an output voltage of the AE sensor and duration time on the magnetic hard disks with various groove depths.

Thus, the inventors investigated the floating stability of a magnetic head in terms of surface roughness of a magnetic hard disk in more detail. The floating stability of a magnetic head can be evaluated by an output voltage of an acoustic emission sensor installed on the magnetic head, which detects a dynamic contact of the magnetic head against the surface of the rotating magnetic hard disk. FIG. 2 shows an instrument for the acoustic emission measurement, which mainly consists of stage 11, an air-spindle rotator 12, a magnetic hard disk 13, a magnetic head 14, an acoustic emission sensor 15, an amplifier/band-path filter circuit 16 and an output terminal 17. When the magnetic hard disk 13 is rotated at a constant track-speed of 12 meters per second for measurements, the magnetic head 14 is lifted off by 25 nm above the disk surface. FIG. 3 shows a cross-sectional view of a magnetic hard disk having a flat surface with no grooves. The magnetic hard disk consists of a flat substrate 1 and successively laminated three thin films of 20 nm-thick chromium 2, 20 nm-thick cobalt-chromium-platinum-tantalum alloy 3, and 20 mn-thick amorphous carbon 4. FIG. 4 shows an experimental result of the magnetic hard disk having a flat surface with no grooves. The result indicates that the output voltage of the acoustic emission sensor versus time is unchanged for more than 1000 hours. It was also confirmed that the floating stability was maintained for more than 1000 hours during continuous operation with a currently commercially available magnetic hard disk having grooves as far as the floating distances of the magnetic head are 50 nm and 100 nm. On the other hand, when the floating distances of the magnetic head were changed to be 30, 25 and 20 nm, the crashes occurred within 50, 5 and 3 hours, respectively. FIG. 5 shows a cross-sectional view of magnetic hard disks having concentric grooves of 30 nm, 60 nm, and 90 nm in depth with 0.3 nm in width and 3.0 nm in pitch. FIG. 6 shows an experimental result of the magnetic disks having different groove depths. Although there was some difference in durability between the magnetic hard disks having different depths of the groove, all of them started increasing in an output of the acoustic emission (or AE) sensor within 4 hours and that crashed to the disk within about 30 minutes after the respective steep increases of the output. The result of all durability tests of the floating magnetic head by continuous operation are tabulated in Table 1, together with the conventional magnetic hard disks.

TABLE 1

| No. | Groove Depth (nm) | Floating Distance (nm) | Life (hour) | Notes |
|---|---|---|---|---|
| 1 | 30 | 20 | less than 3 | |
| 2 | 30 | 25 | less than 3 | FIG. 6 |
| 3 | 60 | 25 | less than 4 | FIG. 6 |
| 4 | 90 | 25 | less than 4.5 | FIG. 6 |
| 5 | 30 | 25 | less than 5 | |
| 6 | 0 | 25 | more than 1000 | FIG. 4 |
| 7 | 30 | 30 | less than 50 | |
| 8 | 0 | 50 | more than 1000 | Prior Art |
| 9 | 30 | 50 | more than 1000 | Prior Art |
| 10 | 30 | 100 | more than 1000 | |

It can be concluded from these experiments that it becomes more difficult to maintain sufficient stability of the floating head as a distance between the floating head and the surface of the grooved magnetic hard disks becomes smaller.

Figure 7:
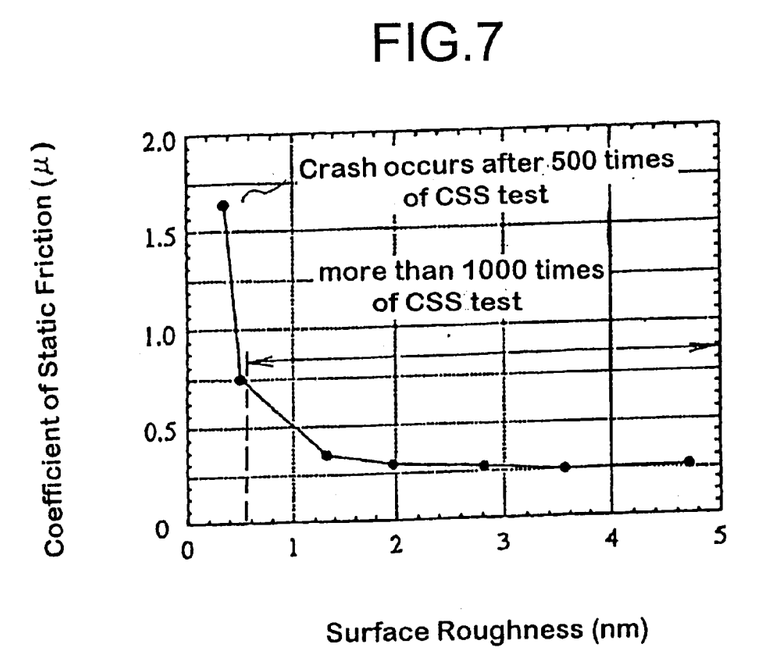
FIG. 7 is a graph of relationship between static friction and surface roughness of magnetic hard disks by CSS durability test.
Figure 8:
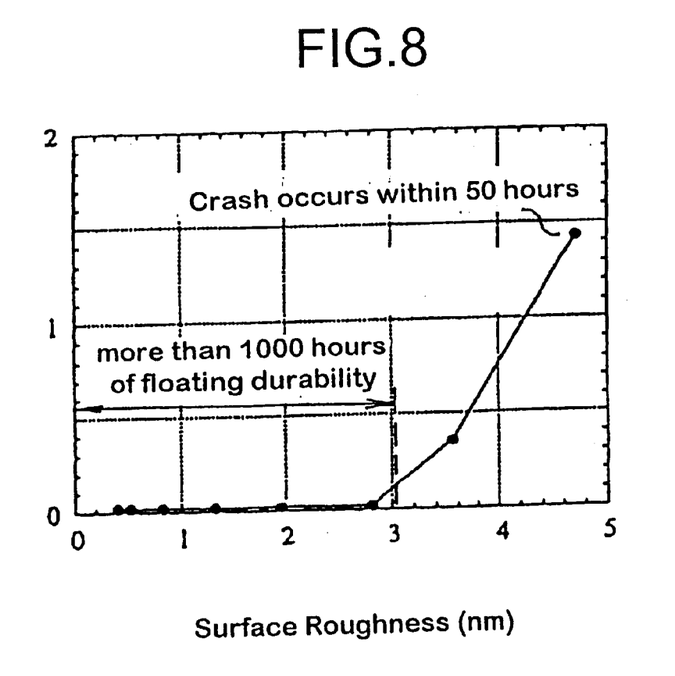
FIG. 8 is a graph of relationship between an AE sensor output and surface roughness of magnetic hard disks by floating durability test.

On the other hand, a magnetic head is usually rested on the surface of a magnetic disk when the device is not operated. As the disk starts rotating, the magnetic head is lifted off from the surface of a magnetic disk by air-flow. This type of operating method is called a "contact start and stop" (or-CSS) method. It is known that in the CSS method, a magnetic head often does not leave promptly from the contact surface of the disk when the disk starts rotating because the head clings to the contact surface. This effect results in instability of the magnetic head or even permanent damage of the magnetic head. Thus, another series of experiments were carried out to study an effect of surface roughness of protective films on the instability due to the CSS method. Protective films having various surface roughness and materials were prepared to measure the coefficient of static friction and an AE sensor output for floating stabilities of static and dynamic states, respectively. Samples for the measurements have substantially the same structure as that shown in FIG. 3. Various textured surfaces were provided by polishing the surface with polishing powder having different sizes. FIG. 7 shows a relationship between the coefficient of static friction and surface roughness obtained by the CSS method. The graph indicates that the coefficient of static friction increased rapidly as the surface roughness decreased below 0.5 nm, in which the surface roughness is measured by a height from an averaged center line as defined by Japanese Industrial Standard (or JIS) B 0601-1982, unless otherwise referred to. Further, the crash occurred after roughly 500 time-repetition of stop and start operation under contact condition at an average surface roughness of 0.2 nm. In contrast, no crash occurred after more than 1000 time-repetition test at an average surface roughness of greater than 0.5 nm. FIG. 8 shows a relationship between an output voltage of an AE sensor and surface roughness. The graph in FIG. 8 indicates that the output voltage of an AE sensor increased rapidly beyond an average surface roughness of greater than 3 nm. The crash occurred within 50 hours at an average surface roughness of 4.7 nm. While no crash occurred for more than 1000 hours for dynamic floating durability test at an average surface roughness of smaller than 3 nm.

Thus, flatness and roughness of the surface of a magnetic hard disk should be precisely selected to fulfill the foregoing technical requirements for an advanced magnetic hard disk having high density magnetic tracks.

Embodiment 1

Figure 9A:
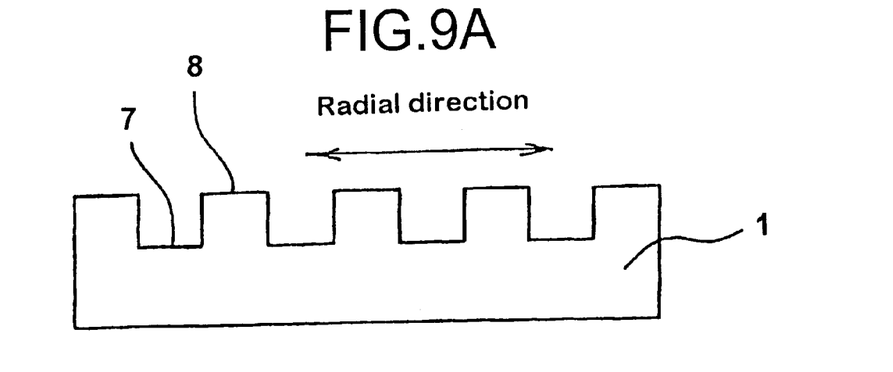
FIGS. 9A through 9C are partial cross-sectional views of a magnetic hard disk in various fabrication processing steps for the first embodiment according to the present invention.
Figure 9B:
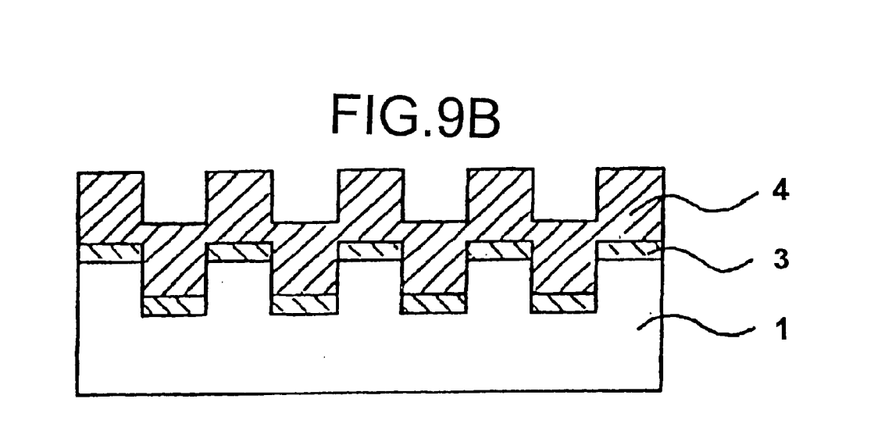
Figure 9C:
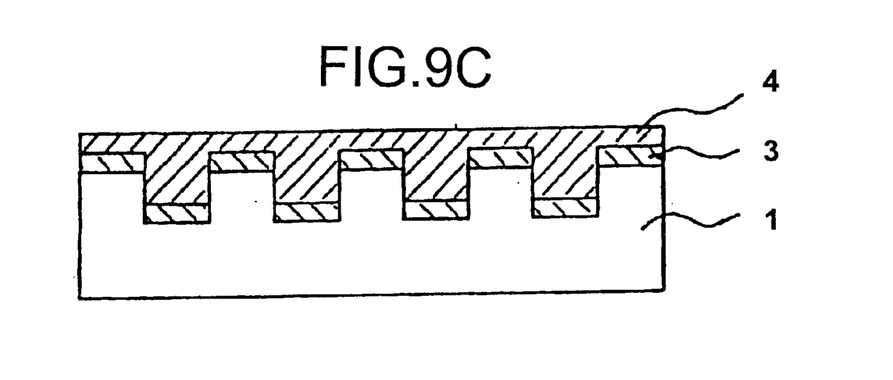

FIGS. 9A through 9C are partial cross-sectional views of a magnetic disk in various fabrication processing steps for the first embodiment of the present invention.

A disk substrate 1 is made of non-magnetic material such as aluminum, aluminum alloy, ceramics, glass or plastics, or antiferro-magnetic material such as MnO, $Cr_2O_3$, FeS, $FeCl_2$ or MnAs. Further, a surface of the disk substrate 1 may be coated by an aluminum oxide film, electroplating metal films or alike to obtain better flatness and anticorrosion. Concentric grooves 7 are formed on the surface of the disk substrate 1 leaving concentric banks 8 alternately to each other by photolithography and anisotropic etching. FIG. 9A is a partial radial cross-sectional view of a disk substrate 1. A magnetic film 3 is formed on the surface of the banks by depositing magnetic material in a normal direction to the surface of the disk substrate by which the magnetic film may be deposited on the bottom of the grooves but not on the side wall. Each of the magnetic films on the surface of the banks must be separated from the nearest magnetic film on the surface of the banks and bottoms so as to neglect magnetic interference between them. A non-magnetic film 4 is successively deposited over the entire surface of the disk substrate such that the non-magnetic film 4 is thick enough to refill the grooves as shown in FIG. 9B. Subsequently, the non-magnetic film 4 is polished precisely until a thin protective film, such as 20 nm thick, on the magnetic film 3 on each of the banks 8 is left and surface roughness is in a range of 0.5 nm to 3 nm as shown in FIG. 9C. The magnetic disk of this structure simultaneously satisfies both requirements for surface roughness of the upper surface for the stabilities of static and dynamic states and complete separation between neighboring magnetic tracks.

Embodiment 2

Figure 12A:
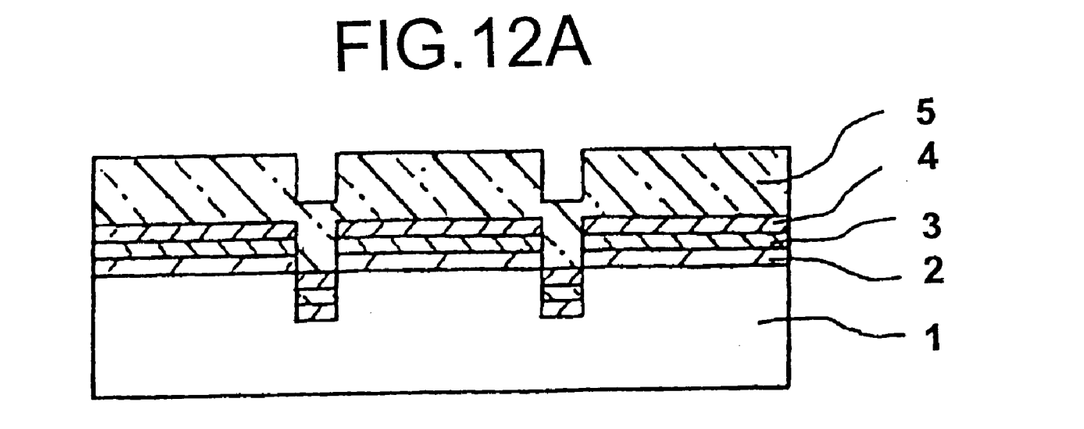
FIGS. 12A and 12B are partial cross-sectional views of a magnetic hard disk before and after planarization processes, respectively, for the second through fourth embodiments according to the present invention.

FIG. 12A is a partial cross-sectional view of a magnetic hard disk before planarization for the second embodiment according to the present invention.

Concentric grooves were formed on the surface of a glass substrate 1 of 3.5 inch diameter. Width of a track was 2.7 $\mu$m wide. Width and depth of the groove were 0.3 $\mu$m wide and 50 nm deep, respectively. A 20 nm thick underlay of Chromium film 2, a 20 nm thick magnetic film 3 of Cobalt-Chromium-Platinum-Tantalum alloy, a 20 nm thick Chromium film 4 of the first non-magnetic film were successively deposited on the grooved substrate by sputtering method, and subsequently a 80 nm thick SiO2 film 5 of the second non-magnetic film was deposited by either sputtering or CVD method until the groove was completely refilled as shown in FIG. 12A.

Figure 12B:
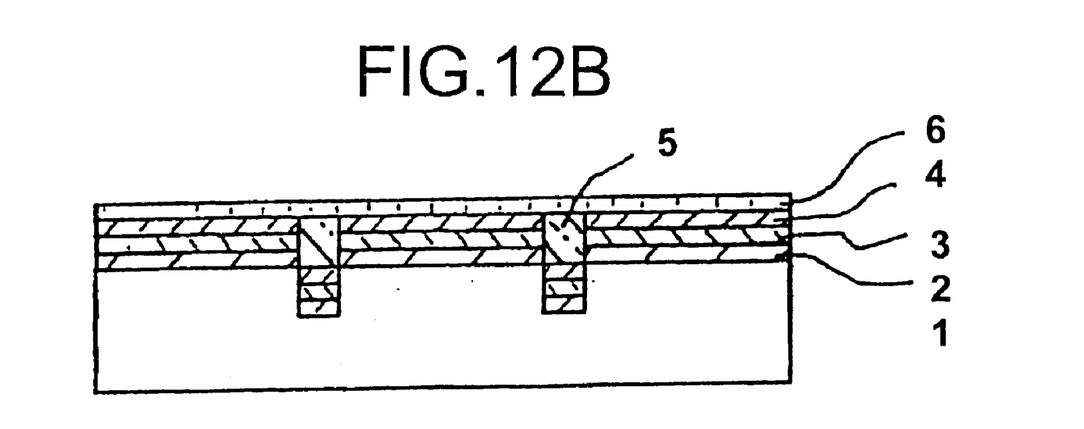

FIG. 12B is a partial cross-sectional view of a magnetic hard disk after planarization for the second embodiment according to the present invention.

The SiO2 film 5 was planarized by chemical mechanical polishing (or CMP) method until the Chromium film 4 was exposed. Detailed condition of the CMP method was as follows:

Polishing agent was KOH solution added colloidal silica slurry (about 20 $\mu$m in diameter) diluted with water until the volume reached ten times larger than that of the slurry. Polisher was polyurethane cloth. Load was 2.6 kgf. Revolution speed of a stage was 50 rpm. The planarization process is not only limited to the CMP method but also an etch-back method widely used in semiconductor wafer fabrication is feasible.

After planarization, a 10 nm thick amorphous carbon (or a-carbon) film 6 as the third non-magnetic film was deposited all over the polished surface. The a-carbon film acts as a protective film for an anti-corrosion and anti-wearing purposes. This a-carbon film had surface roughness of 0.83 nm. In the Embodiment 1, the disk substrate can be replaced by poly-carbonate (PC), amorphous poly-olefin (a-PO), or poly-methyl-metacrylate (PMMA) substrate. The other conditions being equal, the third non-magnetic films for these replaced disk substrates had the surface roughness of 0.91 nm, 0.88 nm, and 0.90 nm, respectively.

Embodiment 3

Two different samples were prepared, wherein one of the disk substrate was glass and another was poly-carbonate. The first and second non-magnetic films of both cases were selected to be a 10 nm thick a-carbon and a 10 nm thick Chromium film, and the other conditions were equal to those in the Embodiment 2. All cases of Embodiment 2 and 3 with surface roughness from 0.5 nm to 3 nm satisfied the both requirements for dynamic and CSS durability tests.

Embodiment 4

Figure 10:
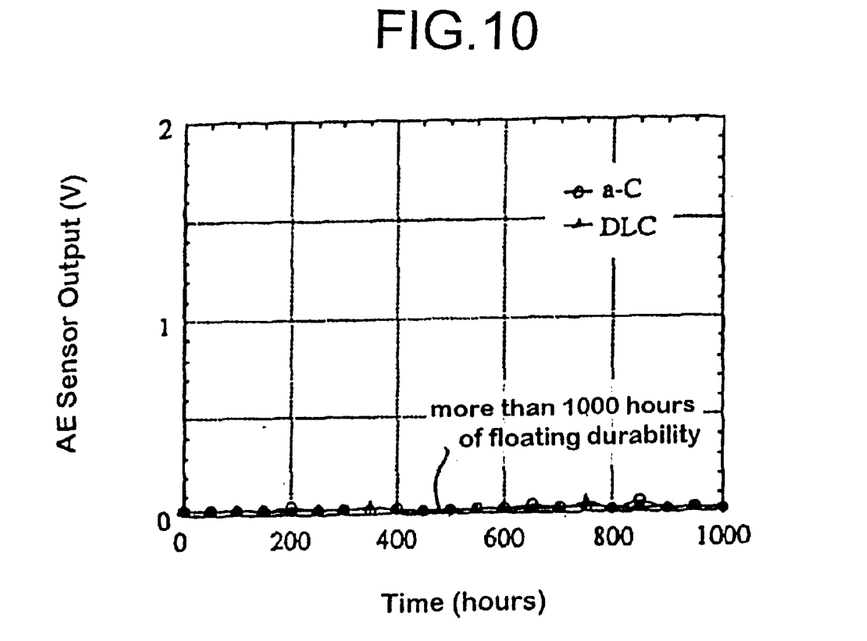
FIG. 10 is a graph of relationship between output voltages of an AE sensor and duration time on magnetic hard disks having protective films of a-carbon and DLC.
Figure 11:
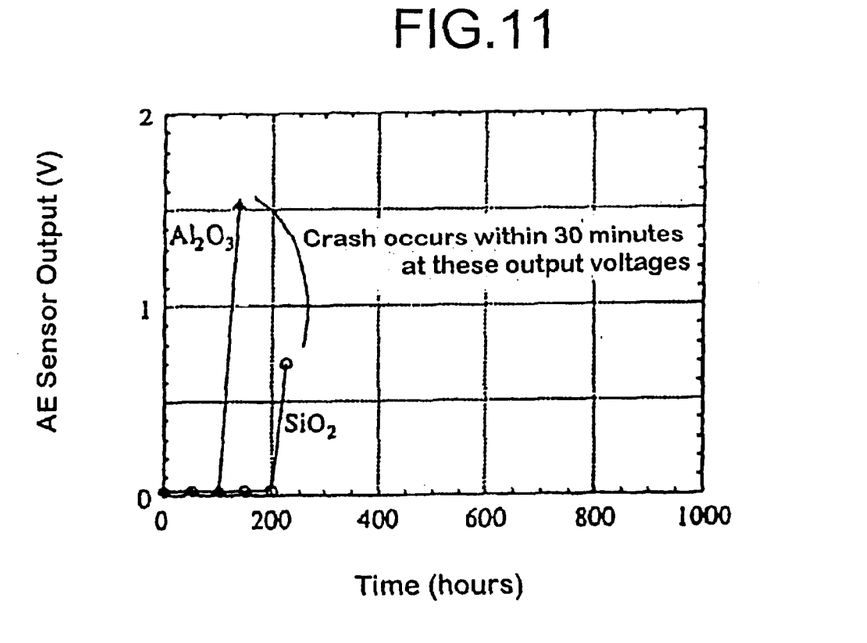
FIG. 11 is a graph of relationship between output voltages of an AE sensor and duration time on magnetic hard disks having protective films of Al2O3 and SiO2.

To know the effect of materials of the protective film, the third non-magnetic film in Embodiment 2, on the floating characteristics of the magnetic head, two groups of samples having different materials for the protective non-magnetic film 4 were formed directly on disk substrates having a flat and smooth surface, the disk substrates are made of glass and PC. The protective non-magnetic films of the first and second groups were a-carbon and diamond-like carbon (DLC), and Al2O3 and SiO2, respectively. Both samples of the first group showed stable operations for more than 1000 hours as shown in FIG. 10, while both samples of the second group crashed within 100 to 200 hours as shown in FIG. 11. These results suggest that hardness of the protective (or third) non-magnetic film must be higher than that of Al2O3 or SiO2 film. Silicon nitride (Si3N4) is another prospective material for the protective (or third) non-magnetic film. All experimental results on floating durability are summarized in Table 2.

TABLE 2

| No. | substrate | 1'st non-magnetic film | 2'nd non-magnetic film | Protective film | surface roughness (nm) | Floating durability (hours) |
| --- | --- | --- | --- | --- | --- | --- |
| 1 | glass | Cr | SiO2 | a-carbon | 0.83 | more than 1000 |
| 2 | PC | Cr | SiO2 | a-carbon | 0.91 | more than 1000 |
| 3 | a-PO | Cr | SiO2 | a-carbon | 0.88 | more than 1000 |
| 4 | PMMA | Cr | SiO2 | a-carbon | 0.90 | more than 1000 |
| 5 | glass | a-carbon | Cr | a-carbon | 0.94 | more than 1000 |
| 6 | PC | a-carbon | Cr | a-carbon | 0.98 | more than 1000 |
| 7 | glass or PC | — | — | a-carbon | 0.90 | more than 1000 |
| 8 | glass or PC | — | — | DLC | 0.92 | more than 1000 |
| 9 | glass | a-carbon | — | — | 60 (groove depth) | less than 3 |
| 10 | PC | a-carbon | — | — | 60 (groove depth) | less than 4 |
| 11 | glass or PC | — | — | Al2O3 | 1.05 | less than 100 |
| 12 | glass or PC | — | — | SiO2 | 1.01 | less than 200 |

As described above, to ensure stable continuous operation for more than 1000 hours, the surface roughness of the magnetic hard disk should be greater than 0.5 nm for the CSS type operation and smaller than 3.0 nm for a floating head with a floating distance lower than 3.0 nm. Although it is important that magnetic tracks are magnetically isolated from each other on writing or reading operation, a groove between concentric magnetic tracks is not essential to the present invention.

Embodiment 5

FIGS. 13A through 13D are partial cross-sectional views of a magnetic hard disk in various fabrication processing steps for the fifth embodiment according to the present invention.

Figure 13A:
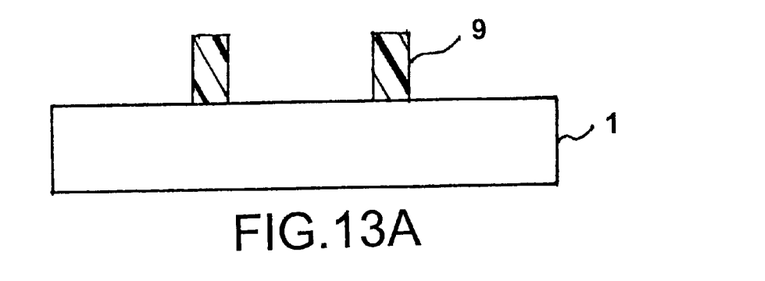
FIGS. 13A through 13D are partial cross-sectional views of a magnetic hard disk in various fabrication processing steps for the fifth embodiment according to the present invention.
Figure 13B:
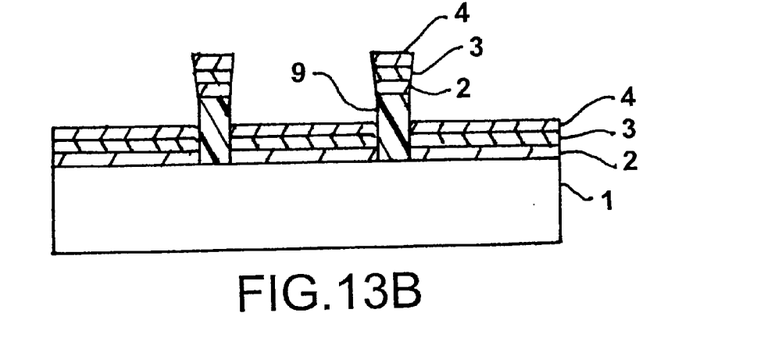
Figure 13C:
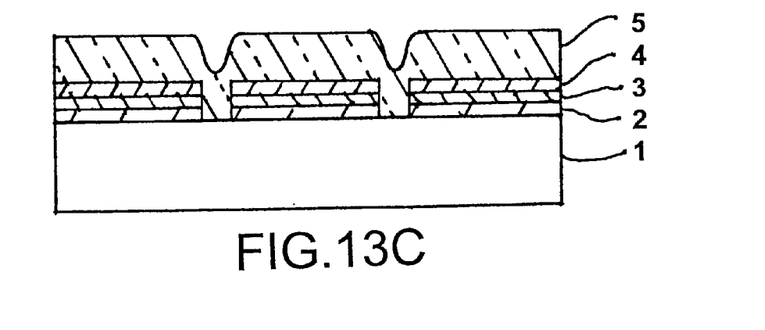
Figure 13D:
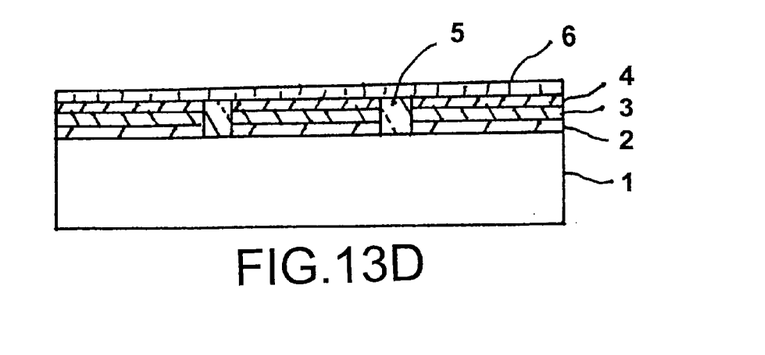

Photoresist patterns 9 concentrically arranged around a center of a substrate disk is formed on a flat upper surface of a glass substrate 1, as shown in FIG. 13A. Width and space of the patterns are 0.3 μm wide and 2.7 μm wide, respectively. A 20 nm thick underlay of Chromium film 2, a 20 nm thick magnetic film 3 of Cobalt-Chromium-Platinum-Tantalum alloy, a 20 nm thick Chromium film 4 of the first non-magnetic film are successively deposited on the patterned substrate from the perpendicular direction to the substrate by sputtering method as shown in FIG. 13B. The photoresist patterns 9 are removed together with the unnecessary films deposited thereon by lift-off method to leave concentric magnetic tracks on the substrate. Subsequently, a 80 nm thick SiO2 film 5 is deposited uniformly by either sputtering or CVD method until the magnetic tracks and the space therebetween are completely buried as shown in FIG. 13C. The SiO2 film 5 is planarized by CMP method until the Chromium film 4 as a stopper film is exposed so that the planarized surface have surface roughness smaller than 3 nm. A 10 nm thick a-carbon film 61 is deposited all over the polished surface as shown in FIG. 13D. Finally, the surface is roughened by another polishing so that the final surface has roughness greater than 0.5 nm maintaining the surface roughness smaller than 3 nm inherited from the surface roughness of the underlaid SiO1 film.

What is claimed is:

1. A magnetic hard disk rotatable around a center of the disk having a plurality of magnetic tracks concentrically, disposed around the center of the disk and spaced to each other, the magnetic hard disk comprising:
    a substrate made of non-magnetic or antiferro-magnetic material having an upper surface;
    a magnetic film patterned concentrically around the center of said substrate on the upper surface to form the magnetic tracks having a space between each pair of the magnetic tracks adjacent to each other; and
    a non-magnetic film continuously formed on both said magnetic film and the space such that an upper surface of said non-magnetic film is substantially in a plane parallel to a plane of rotation of the magnetic hard disk, wherein the roughness of the upper surface of said non-magnetic film is in a range between 0.5 nm and 3 nm.

2. A magnetic hard disk according to claim 1, further comprising:
    a first non-magnetic film underlies at least said magnetic film.

3. A magnetic hard disk according to claim 1, wherein said substrate is selected from the group consisting of glass, ceramics, aluminum, aluminum alloy and plastics such as poly-carbonate, amorphous poly-olefin and poly-ethylmetacrylate.

4. A magnetic hard disk according to claim 1, wherein the space is depressed from a lower surface of said magnetic film.

5. A magnetic hard disk according to claim 4, further comprising a magnetic film patterned on a bottom surface of the depressed space.

6. A magnetic hard disk according to claim 5, wherein depth of the depressed space is selected such that a magnetic field from said magnetic film on the bottom surface of the depressed space is negligible at said magnetic film on said magnetic tracks adjacent to the depressed space.

7. A magnetic hard disk according to claim 1, wherein width of the space is selected such that a magnetic field from said magnetic film on one of a pair of the magnetic tracks adjacent to the space is negligible at said magnetic film on an opposite one of said magnetic tracks across the space.

8. A magnetic hard disk according to claim 1, wherein the magnetic hard disk has a data area and servo area thereon, the data area including a plurality of concentric magnetic tracks spaced to each other, the servo area extending in a radial direction crossing the concentric magnetic tracks, and upper surfaces of the magnetic hard disk in both data and servo areas have surface roughness between 0.5 nm and 3 nm.

9. A magnetic hard disk according to claim 1, wherein the upper surface of said non-magnetic film has texture-like patterns.

10. A magnetic hard disk rotatable around a center of the disk comprising:
    a substrate made of non-magnetic or antiferro-magnetic material having an upper surface;
    a magnetic film patterned concentrically around the center of said substrate on said upper surface to form a plurality of magnetic tracks having a space between each pair of said magnetic tracks adjacent to each other;
    a first non-magnetic film disposed on said magnetic film;
    second non-magnetic film filing said space such that both upper surfaces of said first and second non-magnetic films are continuous with each other and substantially in a plane parallel to the plan of rotation of said magnetic hard disk; and
    a third non-magnetic film continuously formed on both said upper surfaces of said first and second non-magnetic films;
    wherein the roughness of an upper surface of said third non-magnetic film is in range between 0.5 nm and 3 nm.

11. A magnetic hard disk according to claim 10, wherein said first and second non-magnetic films are selected such that a removing rate of said first non-magnetic film is lower in simultaneous chemical mechanical polishing or etching process than a removing rate of said second non-magnetic film.

12. A magnetic hard disk according to claim 10, wherein said first non-magnetic film is selected from a group consisting of amorphous carbon, diamond-like carbon, diamond-like carbon, silicon nitride and chromium.

13. A magnetic hard disk according to claim 10, wherein said second non-magnetic film is made of glass containing silicon oxide.

14. A magnetic hard disk according to claim 10, wherein said third non-magnetic film is selected from a group consisting of amorphous carbon, diamond-like carbon and silicon nitride.

15. A magnetic hard disk according to claim 10, wherein a coefficient of statical friction of said third non-magnetic film is smaller than 0.75.

* * * * *

UNITED STATES PATENT AND TRADEMARK OFFICE
CERTIFICATE OF CORRECTION

PATENT NO. : 6,583,957 B1  
DATED : June 24, 2003  
INVENTOR(S) : Takeshita et al.

Page 1 of 1

It is certified that error appears in the above-identified patent and that said Letters Patent is hereby corrected as shown below:

<u>Title page,</u>  
Item [56], References Cited, U.S. PATENT DOCUMENTS, delete "4,935,378 A * 6/1990 Kroumbi et al." and insert -- 4,935,278 A * 6/1990 Krounbi et al. --.

<u>Column 9,</u>  
Line 30, insert -- a -- before "second non-magnetic film".  
Line 30, delete "filing" and insert -- filling --.

<u>Column 10,</u>  
Line 1, delete "plan" and insert -- plane --.  
Line 19, delete "diamond-like carbon".

Signed and Sealed this

Eleventh Day of May, 2004

JON W. DUDAS  
*Acting Director of the United States Patent and Trademark Office*